United States Patent
Latapie et al.

(10) Patent No.: US 12,518,529 B2
(45) Date of Patent: Jan. 6, 2026

(54) REFLECTION DETECTION IN VIDEO ANALYTICS

(71) Applicant: Cisco Technology, Inc., San Jose, CA (US)

(72) Inventors: Hugo Latapie, Long Beach, CA (US); Ozkan Kilic, Long Beach, CA (US); Adam James Lawrence, Pasadena, CA (US); Gaowen Liu, Austin, TX (US); Ramana Rao V. R. Kompella, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 193 days.

(21) Appl. No.: 17/987,557

(22) Filed: Nov. 15, 2022

(65) Prior Publication Data

US 2024/0161496 A1 May 16, 2024

(51) Int. Cl.
*G06V 20/40* (2022.01)
*G06V 20/52* (2022.01)
*G06V 40/10* (2022.01)

(52) U.S. Cl.
CPC .............. *G06V 20/40* (2022.01); *G06V 20/52* (2022.01); *G06V 40/10* (2022.01); *G06V 2201/08* (2022.01)

(58) Field of Classification Search
None
See application file for complete search history.

(56) References Cited

U.S. PATENT DOCUMENTS

| | | |
|---|---|---|
| 10,887,197 B2 | 1/2021 | Fenoglio et al. |
| 10,965,516 B2 | 3/2021 | Fenoglio et al. |
| 11,336,506 B1 | 5/2022 | Li et al. |
| 11,594,043 B1* | 2/2023 | Xu .................... G06V 20/58 |
| 12,062,367 B1* | 8/2024 | Huynh .................. G10L 15/063 |
| 2005/0180603 A1 | 8/2005 | Zoghlami et al. |
| 2008/0069482 A1 | 3/2008 | Komiya |
| 2009/0153661 A1* | 6/2009 | Cheng ................... G06V 20/52 348/143 |
| 2010/0322516 A1 | 12/2010 | Xu et al. |

(Continued)

FOREIGN PATENT DOCUMENTS

| | | |
|---|---|---|
| WO | WO-2015027289 A1 | 3/2015 |
| WO | WO-2019168323 A1 | 9/2019 |
| WO | WO-2021251062 A1 | 12/2021 |

OTHER PUBLICATIONS

Guan, Huankang, Jiaying Lin, and Rynson WH Lau. "Learning semantic associations for mirror detection." Proceedings of the IEEE/CVF Conference on Computer Vision and Pattern Recognition. 2022. (Year: 2022).*

(Continued)

*Primary Examiner* — Michelle M Entezari Hausmann
(74) *Attorney, Agent, or Firm* — Lee & Hayes, P.C.

(57) ABSTRACT

In one embodiment, a device tracks objects in video data captured by one or more cameras in a location. The device represents spatial characteristics of the objects over time as timeseries. The device associates different portions of the timeseries with behavioral regimes of the objects. The device makes a determination that one of the objects is a reflection of another of the objects, based on a correlation between changes of their respective behavioral regimes.

20 Claims, 10 Drawing Sheets

(56) References Cited

U.S. PATENT DOCUMENTS

| | | |
|---|---|---|
| 2011/0051992 A1 | 3/2011 | Cobb et al. |
| 2012/0063641 A1 | 3/2012 | Venkatesh et al. |
| 2013/0174116 A1 | 7/2013 | Pfeifer |
| 2015/0186779 A1 | 7/2015 | Deng et al. |
| 2016/0105617 A1 | 4/2016 | Kirkby et al. |
| 2016/0328613 A1 | 11/2016 | Gaidon et al. |
| 2019/0073538 A1* | 3/2019 | Ashani ............... G06V 10/774 |
| 2020/0251091 A1 | 8/2020 | Zhao |
| 2020/0319715 A1 | 10/2020 | Holz |
| 2021/0042532 A1 | 2/2021 | Latapie et al. |
| 2021/0174155 A1 | 6/2021 | Smith et al. |
| 2021/0225409 A1 | 7/2021 | Lawlor |
| 2021/0258652 A1 | 8/2021 | Li et al. |
| 2021/0279615 A1 | 9/2021 | Latapie et al. |
| 2021/0312773 A1 | 10/2021 | Debnath et al. |
| 2021/0390423 A1 | 12/2021 | Latapie et al. |
| 2021/0397849 A1 | 12/2021 | Lin et al. |
| 2022/0101654 A1* | 3/2022 | Zhang ................ G06N 3/045 |
| 2022/0138509 A1 | 5/2022 | Crosby et al. |
| 2023/0008567 A1* | 1/2023 | Zikos ................. G06T 17/00 |
| 2024/0087282 A1* | 3/2024 | Young ................ G06V 10/25 |

OTHER PUBLICATIONS

Li Y, Brown MS. Exploiting reflection change for automatic reflection removal. InProceedings of the IEEE international conference on computer vision 2013 (pp. 2432-2439). (Year: 2013).*

Amanlou A, Suratgar AA, Tavoosi J, Mohammadzadeh A, Mosavi A. Single-image reflection removal using deep learning: a systematic review. IEEE Access. Mar. 2, 2022;10:29937-53. (Year: 2022).*

Agrawal, et al., "VQA: Visual Question Answering", Proceedings of the IEEE International Conference on Computer Vision (ICCV), 2015, 25 pages, arXiv:1505.00468v7 [cs.CL].

Ahmed, et al., "Reflection Detection in Image Sequences", CVPR 2011, Jun./Jul. 2011, 9 pages, IEEE, Colorado Springs, CO.

Aleksander, Igor, "Machine consciousness" In Scholarpedia. 3(2):4162, Oct. 21, 2011, 7 pages.

Anderson, et al., "Bottom-Up and Top-Down Attention for Image Captioning and Visual Question Answering", 2018 IEEE/CVF Conference on Computer Vision and Pattern Recognition, Jun. 2018, pp. 6077-6086, IEEE, Salt Lake City, Utah.

Baudrillard, Jean, "Simulacra and Simulation", 1981, 159 pages, Galilee.

Baz, et al., "Context-aware hybrid classification system for fine-grained retail product recognition", 2016 IEEE 12th Image, Video, and Multidimensional Signal Processing Workshop (IVMSP), Jul. 2016, 5 pages, IEEE, Bordeaux, France.

Bĕlohlávek, Radim, "Concept lattices and order in fuzzy logic", Annals of Pure and Applied Logic 128 (2004) 277-298, Elsevier.

Box, G. E. P., "Science and Statistics", In Journal of the American Statistical Association, 71(356), Dec. 1976, pp. 791-799.

Chalmers, David J., "The Conscious Mind: In Search of a Fundamental Theory", 1996, 433 pages, Oxford University Press, New York.

Chella, et al., "A cognitive framework for imitation learning", Robotics and Autonomous Systems 54, Mar. 2006, pp. 403-408, Elsevier.

Chella, et al., "Artificial Consciousness", Chapter 20, In Perception-Action Cycle, 2011, pp. 637-671, Springer, New York.

Chella, et al., "Machine Consciousness: A Manifesto for Robotics", In International Journal of Machine Consciousness, 1(1), Jun. 2009, pp. 33-51, World Scientific Publishing Company.

Cohen, Paul R., "Projections as Concepts", Computer Science Department Faculty Publication Series (194), https://scholarworks.umass.edu/cs/_faculty/_pubs/194, 1997, 6 pages, University of Massachusetts, Amherst.

Cui, et al., "A survey on network embedding", IEEE Transactions on Knowledge and Data Engineering, vol. 31, Issue: 5, May 1, 2019, pp. 833-852, IEEE.

D'Amour, et al., "Underspecification Presents Challenges for Credibility in Modern Machine Learning", Underspecification in Machine Learning, online: https://arxiv.org/pdf/2011.03395.pdf, Nov. 2020, 59 pages.

De Bono, Edward, "The Mechanism of Mind", 1967, 276 pages, Penguin Books.

Düntsch, et al., "Modal-style operators in qualitative data analysis", 2002 IEEE International Conference on Data Mining, 2002. Proceedings, Dec. 2002, pp. 155-162, IEEE, Maebashi City, Japan.

Franco, et al., "Grocery product detection and recognition", Expert Systems With Applications 81 (2017), pp. 163-176, Elsevier Ltd.

George, et al., "Recognizing Products: A Per-exemplar Multi-label Image Classification Approach", ECCV 2014, Part II, LNCS 8690, 2014, pp. 440-455, Springer International Publishing Switzerland.

Goertzel, et al., "CogPrime Architecture for Embodied Artificial General Intelligence", 2013 IEEE Symposium on Computational Intelligence for Human-like Intelligence (CIHLI), Apr. 2013, pp. 60-67, IEEE, Singapore.

Goertzel, Ben, "OpenCogPrime: A Cognitive Synergy Based Architecture for Artificial General Intelligence", 2009 8th IEEE International Conference on Cognitive Informatics, Jun. 2009, pp. 60-68, IEEE, Hong Kong, China.

Gorban, et al., "Blessing of dimensionality: mathematical foundations of the statistical physics of data", Philosophical Transactions of the Royal Society A: Mathematical, Physical and Engineering Sciences, 376.2118, Jan. 2008, 18 pages, The Royal Society Publishing.

Grover, et al., "node2vec: Scalable Feature Learning for Networks", KDD '16: Proceedings of the 22nd ACM SIGKDD International Conference on Knowledge Discovery and Data Mining, Aug. 2016, pp. 855-864, Association for Computing Machinery, New York, NY.

Hamilton, et al., "Representation Learning on Graphs: Methods and Applications", Bulletin of the IEEE Computer Society Technical Committee on Data Engineering, 2017, 23 pages, IEEE.

Hammer, et al., "A Reasoning Based Model for Anomaly Detection in the Smart City Domain", IntelliSys 2020, AISC 1251, pp. 144-159, 2021, Springer Nature Switzerland AG.

Hobbs, Jerry R., "Granularity", In Proceedings of the Ninth International Joint Conference on Artificial Intelligence, 1985, pp. 432-435, Morgan Kaufmann.

Horowitz, Alexandra, "Smelling themselves: Dogs investigate their own odours longer when modified in an "olfactory mirror" test", Behavioural Processes, 2017, 41 pages.

Johnson, Mark, "The Body in The Mind", 1987, 268 pages, The University of Chicago Press.

Jacob, et al., "A Demonstration of the Exathlon Benchmarking Platform for Explainable Anomaly Detection", Proceedings of the VLDB Endowment (PVLDB), Oct. 2021, 5 pages, HAL Open Science.

Jawed, et al., "Self-Supervised Learning for Semi-Supervised Time Series Classification", Pacific-Asia Conference on Knowledge Discovery and Data Mining, PAKDD 2020: Advances in Knowledge Discovery and Data Mining, May 2020, pp. 499-511, Lecture Notes in Computer Science, vol. 12084.

Kiryati, et al., "A probabilistic Hough transform", Pattern Recognition. 24(4), 1991, pp. 303-316, The Pattern Recognition Society.

Korzybski, Alfred, "Manhood of Humanity, The Science and Art of Human Engineering", 1921, 240 pages, E. P. Dutton & Company, New York, NY.

Korzybski, Alfred, "Science and Sanity: An Introduction to Non-Aristotelian Systems and General Semantics", 5th Edition, 1994, 910 pages, Institute of General Semantics, New York, NY.

Korzybski, Alfred, "Videos—This Is Not That", online: https://www.thisisnotthat.com/korzybski-videos/, accessed Nov. 18, 2021, 7 pages.

Lakoff, G., "Women, Fire, and Dangerous Things", 1984, 631 pages, University of Chicago Press.

Latapie, et al., "A Metamodel and Framework for Artificial General Intelligence from Theory to Practice", Journal of Artificial Intelligence and Consciousness, Feb. 12, 2021, 1:30, 24 pages, World Scientific Publishing Company.

(56) References Cited

OTHER PUBLICATIONS

Li, et al., "Concept learning via granular computing: A cognitive viewpoint", Information Sciences 298 (2015), Published Dec. 2014, pp. 447-467, Elsevier Inc.
Lieto, et al., "Conceptual Spaces for Cognitive Architectures: A Lingua Franca for Different Levels of Representation", Biologically Inspired Cognitive Architectures 19, May 2017, 17 pages, Cognitive Robotics and Social Sensing Lab.
Lin, et al., "Progressive Mirror Detection", 2020 IEEE/CVF Conference on Computer Vision and Pattern Recognition (CVPR), Jun. 2020, 9 pages, IEEE, Seattle, WA.
Ma, et al., "Granular computing and Dual Galois Connection", Information Sciences, 177(23), 2007, pp. 5365-5377, Elsevier Inc.
Macaulay, Thomas, "Facebook's chief AI scientist says GPT-3 is 'not a very good' Q&A system", online: https://thenextweb.com/news/facebooks-yann-lecun-says-gpt-3-is-not-very-good-as-a-qa-or-dialog-system, Oct. 28, 2020, accessed Nov. 18, 2021, 3 pages.
Murahari, et la., "Improving Generative Visual Dialog by Answering Diverse Questions", Proceedings of the 2019 Conference on Empirical Methods in Natural Language Processing and the 9th International Joint Conference on Natural Language Processing, Nov. 2018, pp. 1449-1454, Association for Computational Linguistics, Hong Kong, China.
Park, et al., "Identifying Reflected Images from Object Detector in Indoor Environment Utilizing Depth Information", IEEE Robotics and Automation Letters, vol. 6, No. 2, Apr. 2021, pp. 635-642, IEEE.
Patel, et al., "Video Representation and Suspicious Event Detection Using Semantic Technologies", online: http://semantic-web-journal.net/system/files/swj2427.pdf, Semantic Web 0, Sep. 10, 2020, accessed Aug. 9, 2021, 25 pages, IOS Press.
Pauli, Wolfgang, "Part I. General: (A) theory. Some relations between electrochemical behaviour and the structure of colloids", Jan. 1935, pp. 11-27, Transactions of the Faraday Society, vol. 1.
Scarselli, et al., "The Graph Neural Network Model", IEEE Transactions on Neural Networks (vol. 20, Issue: 1, Jan. 2009), pp. 61-80, IEEE.
Speer, et al., "ConceptNet 5.5: An Open Multilingual Graph of General Knowledge", online: https://arxiv.org/pdf/1612.03975.pdf, 2017, 9 pagers, Association for the Advancement of Artificial Intelligence.
Swanson, Bret, "The Exponential Internet", online: https://www.uschamberfoundation.org/bhq/exponential-internet, accessed Nov. 19, 2021, 8 pages, The U.S. Chamber of Commerce Foundation.
Tan, et al., "EfficientDet: Scalable and Efficient Object Detection", online: https://arxiv.org/pdf/1911.09070.pdf, Jul. 2020, 10 pages.
Taylor, J. G., "Codam: A neural network model of consciousness", Neural Networks 20 (2007), pp. 983-992, Elsevier Ltd.
Thorisson, et al., "Cumulative Learning", Artificial General Intelligence—12th International Conference, AGI 2019, Proceedings, pp. 198-208, Springer.
Thorisson, Kristinn R., "A New Constructivist AI: From Manual Methods to Self-Constructive Systems", Chapter 9, Apr. 2012, pp. 147-174, Atlantis Press Book.
Thorisson, Kristinn R., "Integrated AI Systems", Minds & Machines 17, Mar. 2007, pp. 11-25.
Tonioni, et al., "Product recognition in store shelves as a sub-graph isomorphism problem", online: https://arxiv.org/abs/1707.08378, Sep. 2017, 14 pages.
Tripathy, et al., "Explaining Anomalies in Industrial Multivariate Time-Series Data with the Help of explainable AI", 2022 IEEE International Conference on Big Data and Smart Computing (BigComp), Jan. 2022, 8 pages, IEEE, Republic of Korea.
Unger, et al., "The Singular Universe and the Reality of Time: A Proposal in Natural Philosophy", 2015, 558 pages, Cambridge University Press.
Unger, R. M. 2014. "Roberto Unger: Free Classical Social Theory from Illusions of False Necessity", Online Lecture. 45 pages Retrieved on Nov. 22, 2021 from https://www.youtube.com/watch?v=yYOOwNRFTcY.
Wang, et al., "Concept Analysis via Rough Set and AFS Algebra", Information Sciences 178 (2008), pp. 4125-4137, Elsevier Inc.
Wang, Pei, "Experience-grounded semantics: a theory for intelligent systems", Aug. 2004, 33 pages, Elsevier Science.
Wang, Pei, "Insufficient Knowledge and Resources—A Biological Constraint and Its Functional Implications", Biologically Inspired Cognitive Architectures II: Papers from the AAAI Fall Symposium (FS-09-01), 2009, pp. 188-193, Association for the Advancement of Artificial Intelligence (www.aaai.org).
Wang, Pei, "Non-axiomatic logic (nal) specification", online: http://citeseerx.ist.psu.edu/viewdoc/download?doi=10.1.1.167.2069&rep=rep1&type=pdf, Oct. 2009, 88 pages.
Wang, Pei, "On Defining Artificial Intelligence", Journal of Artificial General Intelligence 10(2) 2019, pp. 1-37, Sciendo.
Wang, et al. "Self in NARS, an AGI System", vol. 5, Article 20, Mar. 2018, 15 pages, Frontiers in Robotics and AI.
Wang, et al., "SuperGLUE: A Stickier Benchmark for General-Purpose Language Understanding Systems", online: https://arxiv.org/pdf/1905.00537.pdf, 2019, 29 pages, 33rd Conference on Neural Information Processing Systems (NeurIPS 2019), Vancouver, Canada.
Wikipedia, "Wheat and chessboard problem", online: https://en.wikipedia.org/wiki/Wheat_and_chessboard_problem, Oct. 2021, 5 pages, Wikimedia Foundation, Inc.
Wille, Rudolf, "Restructuring Lattice Theory: An Approach Based on Hierarchies of Concepts", I. Rival (Ed.), Ordered Sets, 1982, pp. 314-339.
Xue, et al., "Real-Time Anomaly Detection and Feature Analysis Based on Time Series for Surveillance Video", IEEE 5th International Conference on Universal Village 108 UV2020 • Session 3ABD-7, Oct. 2020, 7 pages, IEEE, Boston, MA.
Yao, et al., "A Granular Computing Paradigm for Concept Learning", Emerging Paradigms in Machine Learning, Springer, London, pp. 307-326, 2012.
Yao, Y. Y., "Information Granulation and Rough Set Approximation", International Journal of Intelligent Systems, vol. 16, No. 1, 87-104, 2001.
Yao, Y. Y., "Integrative levels of granularity", Human-Centric Information Processing Through Granular Modelling, 2009, 20 pages, Studies in Computational Intelligence, vol. 182. Springer, Berlin, Heidelberg.
Ying, et al., "Graph convolutional neural networks for web-scale recommender systems", online: https://arxiv.org/pdf/1806.01973.pdf, In KDD '18: The 24th ACM SIGKDD International Conference on Knowledge Discovery & Data Mining, Aug. 19-23, 2018, London, United Kingdom. ACM, New York, NY, USA, 10 pages.
Zhou, et al., "Graph neural networks: A review of methods and applications", AI Open, 2020, pp. 57-81, Elsevier B.V.
Zhu, et al., "Describing Unseen Videos via Multi-modal Cooperative Dialog Agents" Computer Vision—ECCV 2020, 17 pages, Lecture Notes in Computer Science, vol. 12368. Springer.

\* cited by examiner

REFLECTION DETECTION IN VIDEO ANALYTICS

TECHNICAL FIELD

The present disclosure relates generally to computer networks, and, more particularly, to reflection detection in video analytics.

BACKGROUND

Video analytics techniques are becoming increasingly ubiquitous as a complement to new and existing surveillance systems. For instance, person detection and reidentification now allows for a specific person to be tracked across different video feeds throughout a location. More advanced video analytics techniques also attempt to detect certain types of events, such as a person leaving a suspicious package in an airport.

Reflections present a challenge to video analytics systems. For instance, consider the case in which a person is located in front of a mirror, which is a common occurrence in many locations. In such a case, the video feed may depict not only the image of the person, but also the reflection of the person, leading the video analytics system to identify both as separate people. This can lead to false reporting by the video analytics system, such as by reporting more people in a location than are actually there, mis-identifying the behaviors of the people in the area, and the like.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
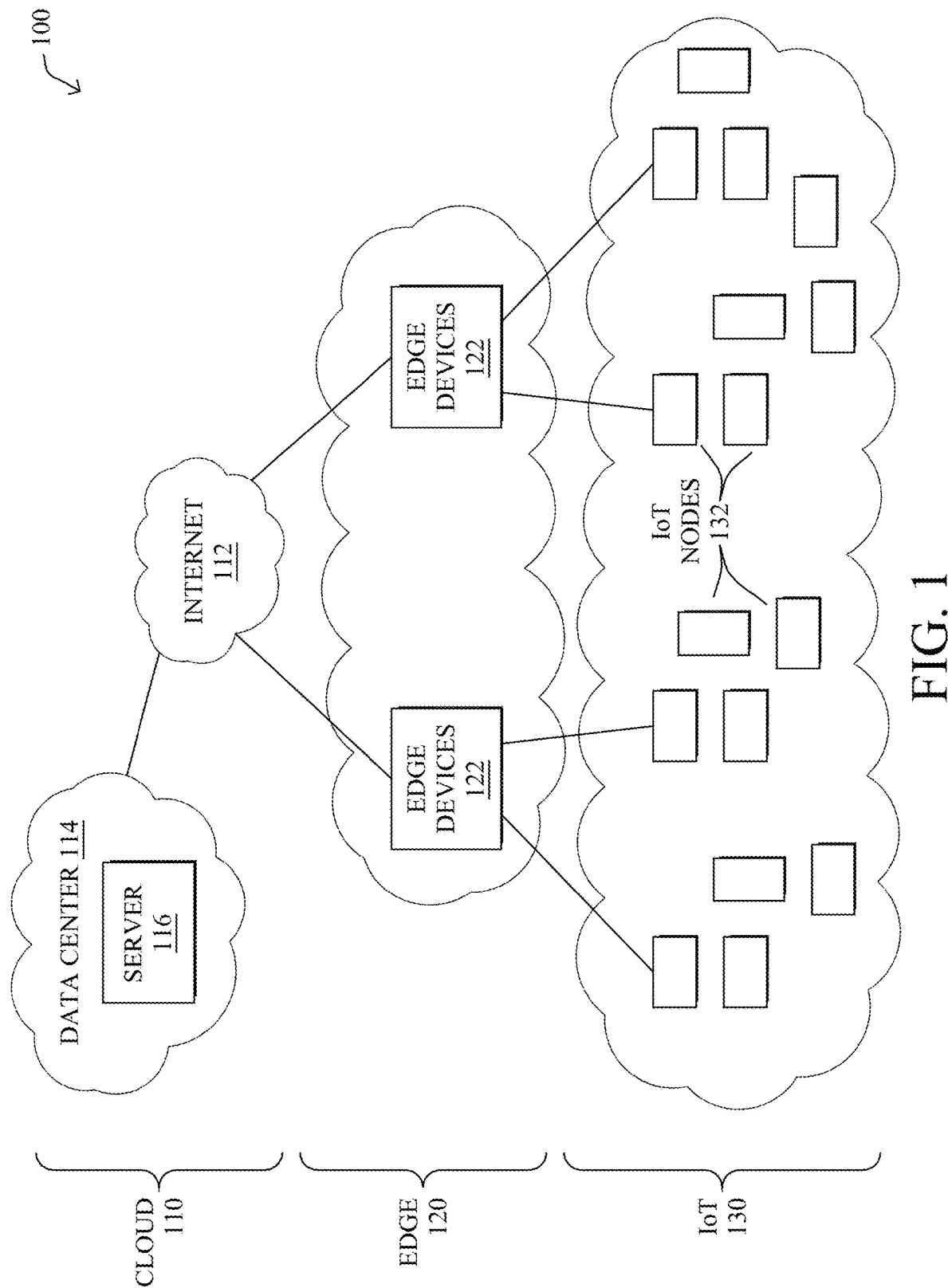
FIG. 1 illustrate an example network.

According to one or more embodiments of the disclosure, a device tracks objects in video data captured by one or more cameras in a location. The device represents spatial characteristics of the objects over time as timeseries. The device associates different portions of the timeseries with behavioral regimes of the objects. The device makes a determination that one of the objects is a reflection of another of the objects, based on a correlation between changes of their respective behavioral regimes.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or wired networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, wired links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), or other shared-media protocols where appropriate. In this context, a protocol consists of a set of rules defining how the nodes interact with each other.

Figure 2:
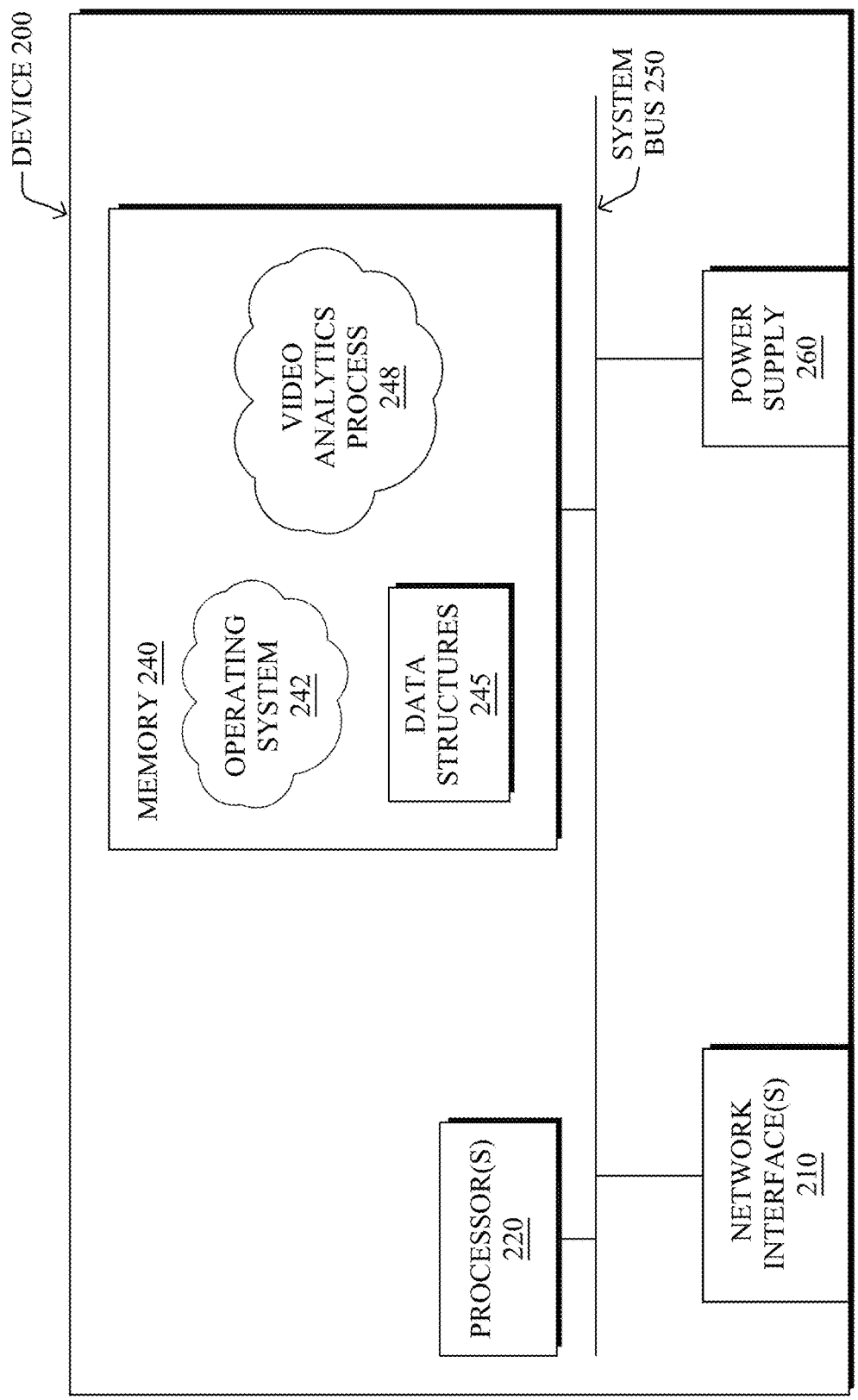
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/

IP, UDP, etc. Note that the device 200 may have multiple different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative video analytics process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, video analytics process 248 may employ one or more supervised, unsupervised, or self-supervised machine learning models. Generally, supervised learning entails the use of a training set of data that is used to train the model to apply labels to the input data. For example, the training data may include sample video data depicting a particular event that has been labeled as such. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Self-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Figure 3:
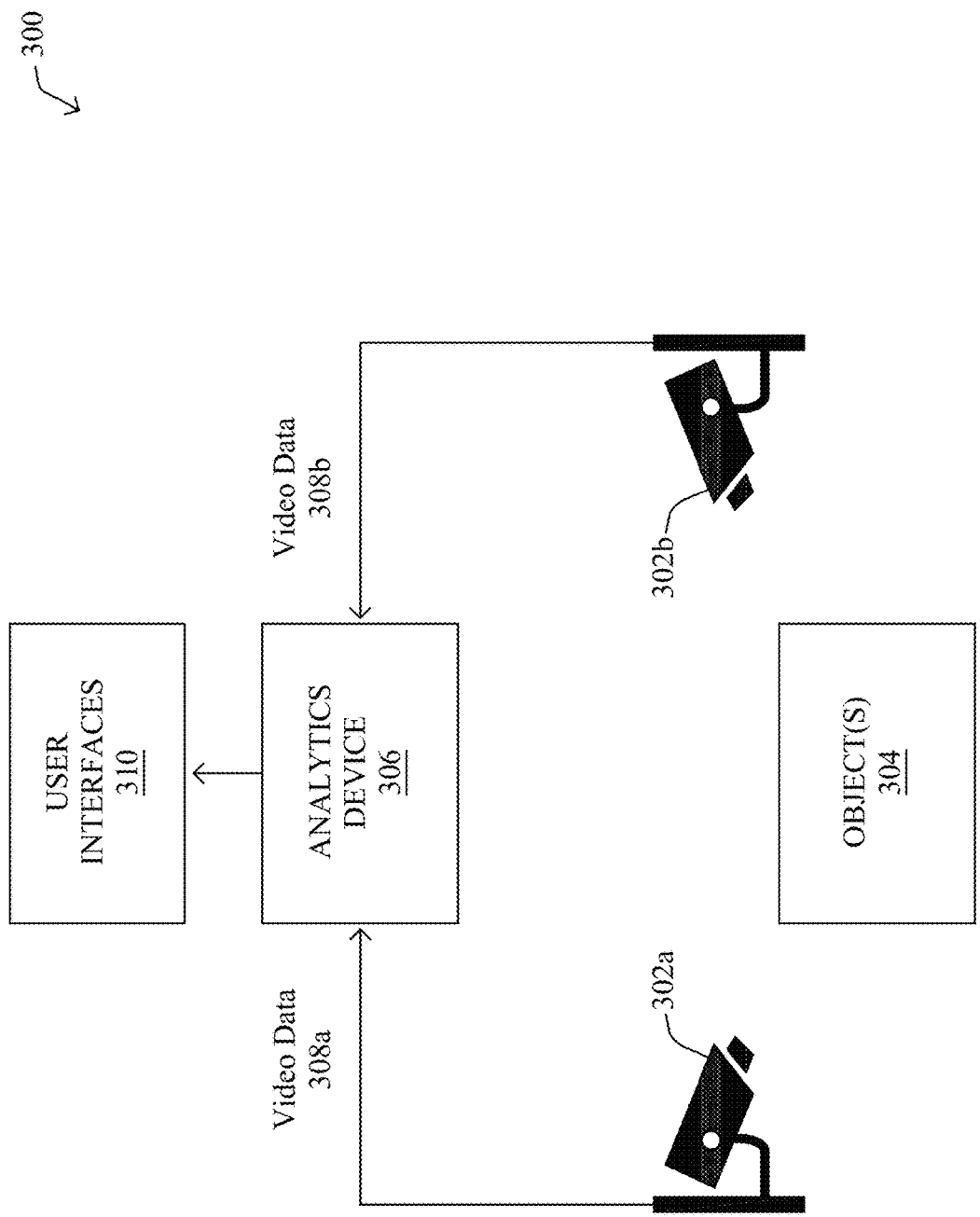
FIG. 3 illustrates an example system for performing video analytics.

FIG. 3 illustrates an example system 300 for performing video analytics, as described in greater detail above. As shown, there may be any number of cameras 302 deployed to a physical area, such as cameras 302a-302b. Such surveillance is now fairly ubiquitous across various locations including, but not limited to, public transportation facilities (e.g., train stations, bus stations, airports, etc.), entertainment facilities (e.g., sports arenas, casinos, theaters, etc.), schools, office buildings, and the like. In addition, so-called "smart" cities are also now deploying surveillance systems for purposes of monitoring vehicular traffic, crime, and other public safety events.

Regardless of the deployment location, cameras 302a-302b may generate and send video data 308a-308b, respectively, to an analytics device 306 (e.g., a device 200 executing video analytics process 248 in FIG. 2). For instance, analytics device 306 may be an edge device (e.g., an edge device 122 in FIG. 1), a remote server (e.g., a server 116 in FIG. 1), or may even take the form of a particular endpoint in the network, such as a dedicated analytics device, a particular camera 302, or the lie.

In general, analytics device 306 may be configured to provide video data 308a-308b for display to one or more user interfaces 310, as well as to analyze the video data for events that may be of interest to a potential user. To this end, analytics device 306 may perform object detection on video data 308a-308b, to detect and track any number of objects 304 present in the physical area and depicted in the video data 308a-308b. In some embodiments, analytics device 306 may also perform object re-identification on video data 308a-308b, allowing it to recognize an object 304 in video data 308a as being the same object in video data 308b or vice-versa.

As noted above, a key challenge with respect to video analytics is the detection of events that may be of relevance to a user. Traditional efforts to detect relevant events in captured video have focused on supervised learning, which requires a training dataset of labeled examples, in order to train a model. For instance, consider the example of two vehicles colliding with one another. In order to detect this event from the captured video data, hundreds or even thousands of example video clips depicting vehicular collisions that have been labeled as such. While this approach can result in a model that is able to detect vehicular collisions under certain circumstances, it also suffers from multiple disadvantages:

1. The training process can be quite cumbersome—In addition to requiring many labeled examples of a particular type of event, which may not even be available, this approach also requires this to be repeated for each type of event to be detected.
2. The trained model is unlikely to detect and adapt to new types of events of interest—For instance, say the model was trained to detect vehicular collisions using training data only showing two cars colliding. However, after deployment, the video data analyzed by the model may depict any number of different types of vehicles (e.g., bicycles, motorcycles, busses, etc.). Consequently, the model may not be able to detect collisions between other types of vehicles that were not included in its training data.

Moreover, reflections present a further challenge to video analytics systems. For instance, consider the case in which a person is located in front of a mirror, which is a common occurrence in many locations. In such a case, the video feed may depict not only the image of the person, but also the reflection of the person, leading the video analytics system to identify both as separate people. This can lead to false reporting by the video analytics system, such as by reporting more people in a location than are actually there, misidentifying the behaviors of the people in the area, and the like.

Reflection Detection in Video Analytics

The techniques herein provide for the detection of reflections in video data and the corresponding reflective surface in a location. In some aspects, the techniques herein may do so by computing the pairwise correlation between the behavioral regimes exhibited by different objects in the area. In further aspects, the techniques herein may also be used to disable object recognition and/or tracking in regions of the video associated with the reflective surface.

Illustratively, the techniques described herein may be performed by hardware, software, and/or firmware, such as in accordance with the video analytics process 248, which may include computer executable instructions executed by the processor 220 (or independent processor of interfaces 210), to perform functions relating to the techniques described herein.

Specifically, according to various embodiments, a device tracks objects in video data captured by one or more cameras in a location. The device represents spatial characteristics of the objects over time as timeseries. The device associates different portions of the timeseries with behavioral regimes of the objects. The device makes a determination that one of the objects is a reflection of another of the objects, based on a correlation between changes of their respective behavioral regimes.

Operationally, in various embodiments, the techniques herein propose detecting reflections in video data through video analytics process 248 being configured first to perform the following:

1. Representing the video data/stream(s) as a set of spatial timeseries; and
2. Analyzing those timeseries to detect regime changes In various embodiments, video analytics process 248 may begin by employing object (re)identification, to track the various object(s) depicted in the video data over time. For instance, a detected object may be any of the following, among others: a person, a vehicle, a package, a suitcase or other portable object, or the like. In some embodiments, video analytics process 248 may also identify a collection of multiple physical objects as a singular object for purposes of tracking an analysis.

Figure 4A:
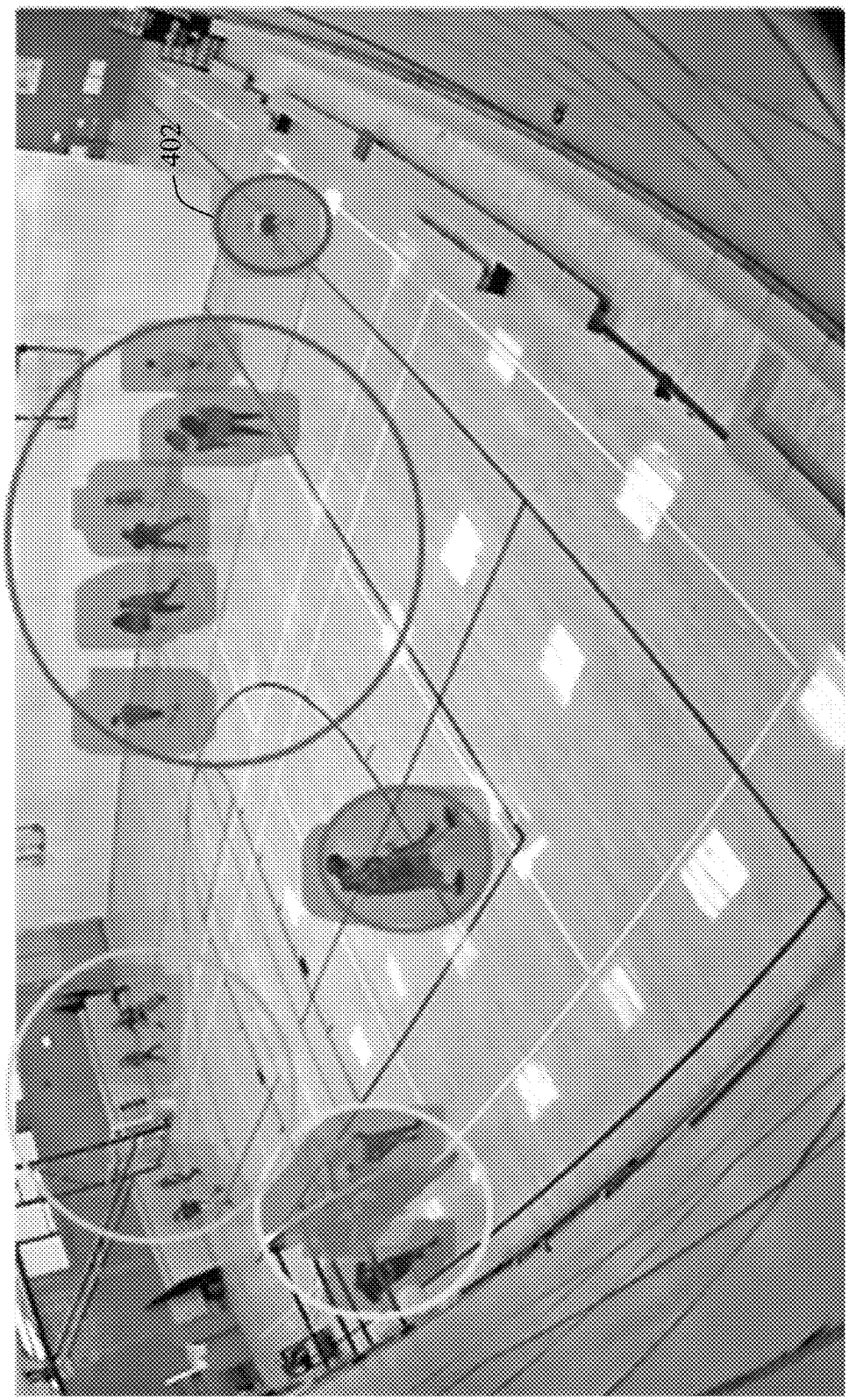
FIGS. 4A-4B illustrate examples of the analysis of different frames of a video feed.
Figure 4B:
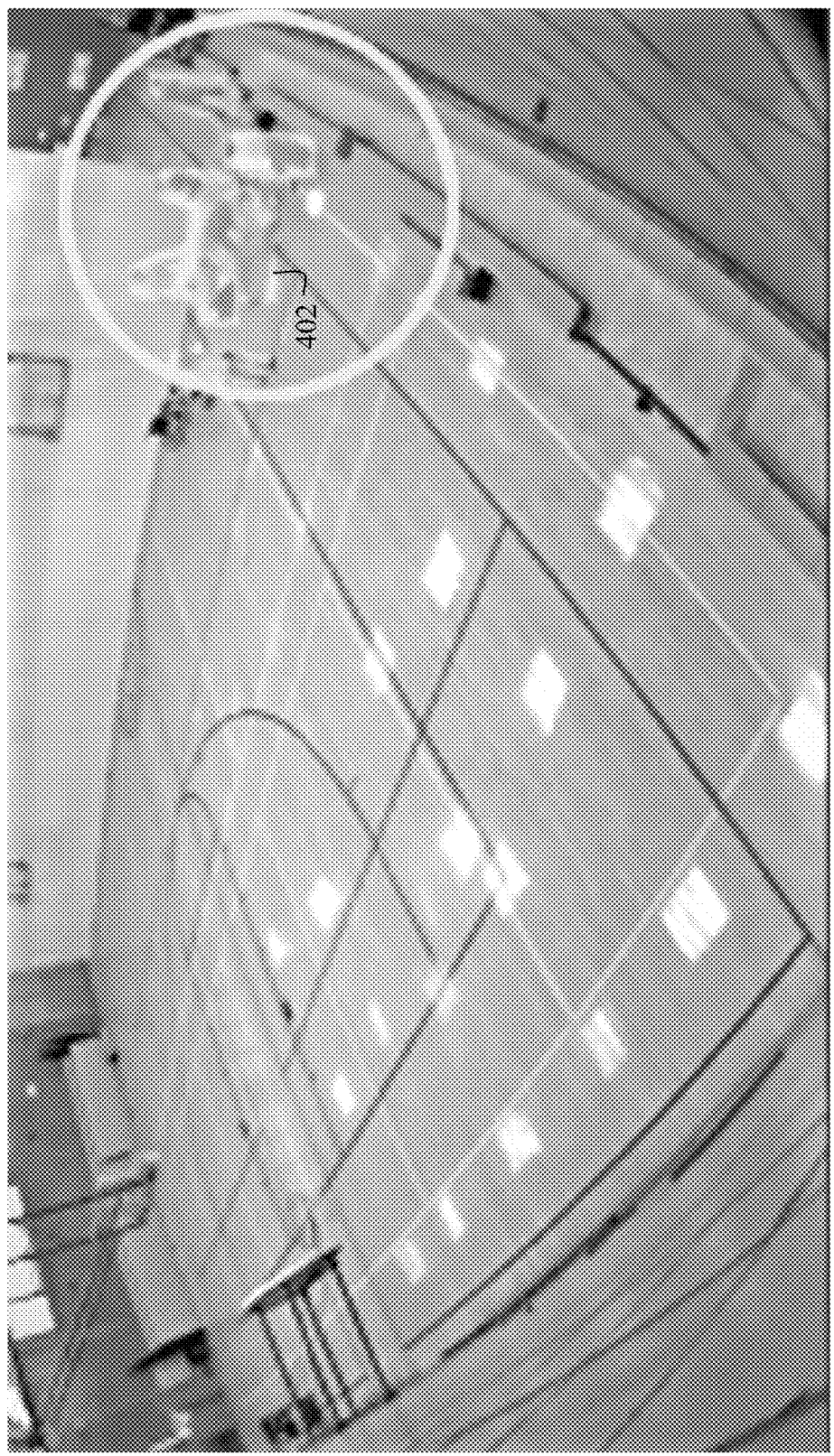

By way of example, FIGS. 4A-4B illustrate different frames 400, 410, respectively, of a video stream from a camera. As shown in FIG. 4A, video analytics process 248 may detect and track different people present in the physical location using a person (re)identification mechanism. Each detected person is shown in frame 400 as highlighted. In addition, video analytics process 248 may also detect clusters of people as separate objects for analysis, each of which is shown in frame 400 as circled.

In various embodiments, video analytics process 248 may, for any or all of the identified objects in the video data, compute their spatial characteristics. For instance, video analytics process 248 may compute the centroid of a certain object, its two-dimensional or three-dimensional coordinates, its shape, its kinematics information, its relative position and/or trajectory with respect to one or more other object(s), the constituent members of a cluster object, or other information regarding the characteristics of the object.

Generally, each timeseries computed by video analytics process 248 represents the spatial characteristics of its associated object (e.g., a singular object or cluster of objects) over time. A key observation herein is that different activities/behaviors performed by the object under analysis will also be reflected in its corresponding timeseries as a distinguishable pattern. For instance, the timeseries for a person standing relatively still for a period of time in the video data will be relatively constant. Conversely, a person playing basketball may have wide variations in their timeseries, as they transition between running, stopping, dribbling the ball, shooting the ball, etc. Each timeseries pattern is referred to herein as a "behavioral regime" as it corresponds to a different activity being performed by the object.

According to various embodiments, video analytics process 248 may detect events of interest in the video data based on the rate of regime changes of the object(s) under analysis. While it may be possible to simply apply anomaly detection to a timeseries to detect anomalous events, doing so could also inadvertently flag regime changes as anomalous, despite them being perfectly normal activities. For instance, as noted above, the spatial timeseries of a person running and then shooting a basketball may exhibit a regime change which might be viewed as anomalous by a traditional anomaly detector. Instead, video analytics process 248 may look to the rate of regime change of the one or more object(s), to identify events that may be of interest.

By way of example, as shown in FIG. 4A, assume that a player 402 has suddenly collapsed on the basketball court, indicating a potential medical emergency. In such a case, the timeseries of the player exhibit a very sudden regime change, due to the player going from running to laying down. This may be of particular interest when compared to that of the other objects, as the other players may not have initially noticed the collapsed player 402.

In addition, as shown in FIG. 4B, the spatial timeseries of the other objects will also exhibit rapid regime changes, as the other players begin to notice the collapsed player 402. Here, the other players may go from behavioral regimes corresponding to running, dribbling, etc. to standing around the collapsed player 402. From the perspective of the cluster objects, this also corresponds to a sudden merging of clusters of people into a singular cluster around the collapsed player 402.

In various embodiments, to analyze the rate of regime changes in the timeseries, in some embodiments, video analytics process 248 may compute the derivatives of the timeseries and compare them to one or more threshold values. Thus, if the derivative of the timeseries exceeds such a threshold, this may indicate a rapid transition to a new regime, which could then be reported to a user interface as an event of interest.

Figure 5:
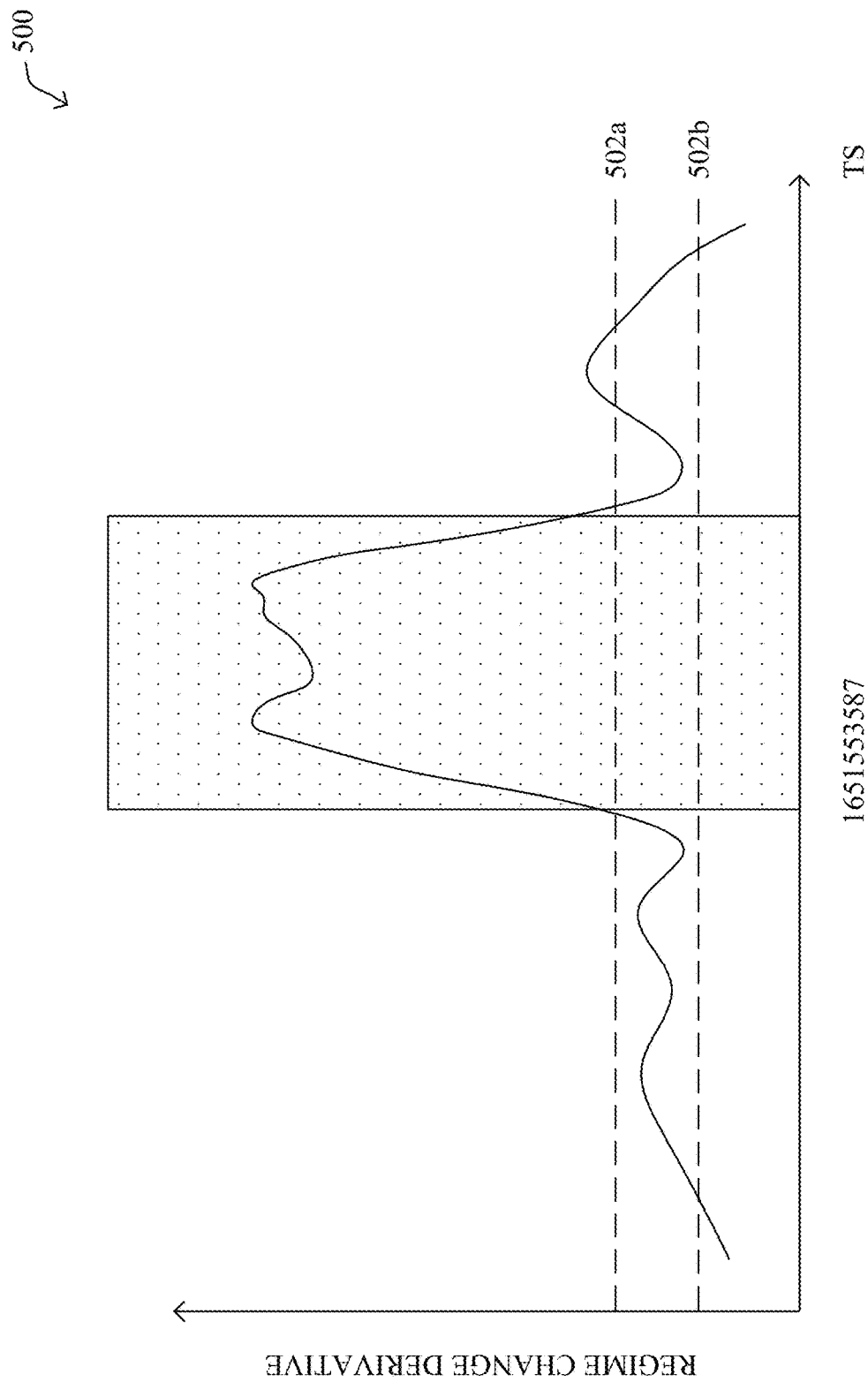
FIG. 5 illustrates an example plot of the regime change derivative for a timeseries.

For instance, FIG. 5 illustrates an example plot 500 of the regime change derivative for a timeseries, according to various embodiments. As shown, assume that there exists a baseline range between thresholds 502a-502b for the regime change derivative of a particular timeseries over time (e.g., a timeseries labeled with the identifier '1651553587'), such as for the player 402 shown in FIGS. 4A-4B. In such a case, when the regime change derivative exceeds threshold 502a, such as due to the player suddenly collapsing, video analytics process 248 may deem this an event of interest and raise an alert to a user interface for further review. Such thresholds may be set manually, based on a percentile or other distribution of values, or the like.

As would be appreciated, this approach does not require training a model to detect any specific type of event, but instead looks at the dynamics of the regime changes of the objects, to detect events that may be of interest. Thus, the techniques herein may be able to raise alerts as to new types of events and other scenarios that may be of interest, even without prior training regarding them.

Of course, reflections present in the video data could lead to video analytics process 248 misreporting information about the video data. For instance, consider the cases in which video analytics process 248 performs functions such as generating alerts based on its detected events, counting people or other objects in the location, etc. In such a case, the video analytics system may inadvertently recognize the reflection of the person or other object as a separate entity, leading to the system generating unnecessary alerts, miscounting the people or other objects in the location, or the like.

Figure 6:
FIG. 6 illustrates an example of video analytics being applied to video from a location with a reflective surface.

By way of example, FIG. 6 illustrates an example of video analytics being applied to video from a location with a reflective surface. As shown, assume that a camera in a location (e.g., an elevator) captures an image 600 of the location. Within the location is a person 602, which video analytics process 248 may track and assess using the techniques described above. However, present within the location may also be a reflective surface, such as a mirror. Accordingly, the object tracking and (re-)identification functions of video analytics process 248 may also detect reflection 604 and treat it as a completely separate entity than that of person 602.

With respect to reflection detection, in some embodiments, video analytics process 248 may simply train a machine learning or deep learning model to ignore or filter out images that are opposing duplicates of one another. This approach may work in certain situations, such as the one depicted in FIG. 6, where the object and its reflection are opposing duplicates of one another. However, this is not the case in many real-life scenarios and would not work in all cases. For instance, consider the case in which the viewpoint of the camera is acing the back of a person and also detects the front view of that same person in their reflection. In such a case, the two portions of the image are not opposing duplicates at all, meaning that such a model will fail to recognize the presence of a reflection in the video feed.

Figure 7:
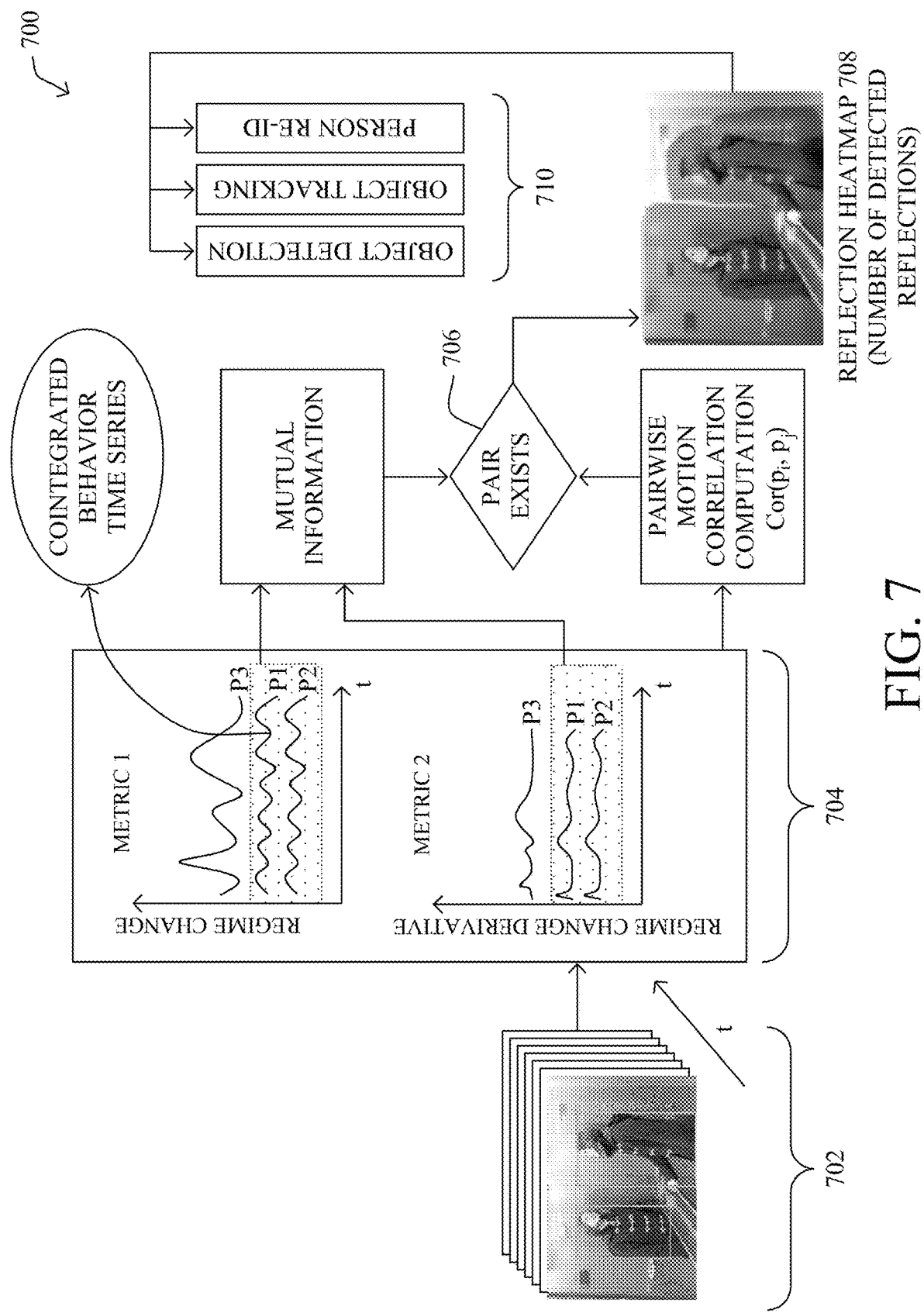
FIG. 7 illustrates an example architecture for identifying a pair of an object and its reflection in video data.

According to various embodiments, FIG. 7 illustrates an example architecture 700 for identifying a pair of an object and its reflection in video data. In contrast to the above approach, video analytics process 248 may implement architecture 700, which is able to identify reflections, regardless of its orientation relative to the real object being depicted in the video data.

As shown, video analytics process 248 may receive video data 702, which comprises a series of images captured over time by one or more cameras. In turn, video analytics process 248 may detect and track the various objects depicted in video data 702, such as the person 602 and their reflection 604 from FIG. 6. In addition, video analytics process 248 may use the techniques described previously to generate timeseries that represent the spatial characteristics of both the detected object/person and their reflection. In turn, video analytics process 248 may also associate different portions of these timeseries with different behavioral regimes, similar to how video analytics process 248 detects events of interest.

According to various embodiments, video analytics process 248 may assess the regime changes for both the object and its reflection relative to one another, to determine whether one of the two is a reflection of the other. To do so, video analytics process 248 may compute the pairwise correlation between the cointegrated behavioral timeseries for the different people detected in video data 702, such as people P1-P3, for instance. As shown, for example, video analytics process 248 may compute the pairwise correlations between the regime change and regime change derivative timeseries that are based on the motions of the different people or other objects detected within video data 702. Any suitable form of correlation metric may be used for this purpose such as, but not limited to, Pearson's correlation coefficient, Spearman's correlation coefficient, or the like.

Based on the pairwise correlations and the mutual information shared by any two people or other objects, video analytics process 248 may make a determination 706 as to whether any pair of them represents an actual person or other object and its reflection. For instance, if the pairwise correlation and/or the mutual information exceeds one or more defined thresholds, video analytics process 248 may determine that such a pair is present in video data 702.

However, a question still remains: which of the two objects in video data 702 that are pairwise correlated is the actual person or other object and which is the reflect? To answer that, video analytics process 248 may, in some embodiments, compute a reflection heatmap 708 for video data 702 based on the number of times an object in any given region of video data 702 was pairwise correlated with another object in a different region, using the above approach. Using such heatmaps, video analytics process 248 may infer that the areas of highest concentration are where the source of the reflection is located (e.g., the location of a reflective surface, such as a mirror). Here, the assumption is that the reflective surface will normally reflect images from a larger area.

Video analytics process 248 may use the detection of a reflection within video data 702 for various purposes, depending on its configuration. For instance, it may use the detected reflection to disregard a region in video data 702 for purposes of further analysis when performing actions 710 such as object detection, object tracking, person re-identification, event detection, person counting, or the like.

Figure 8:
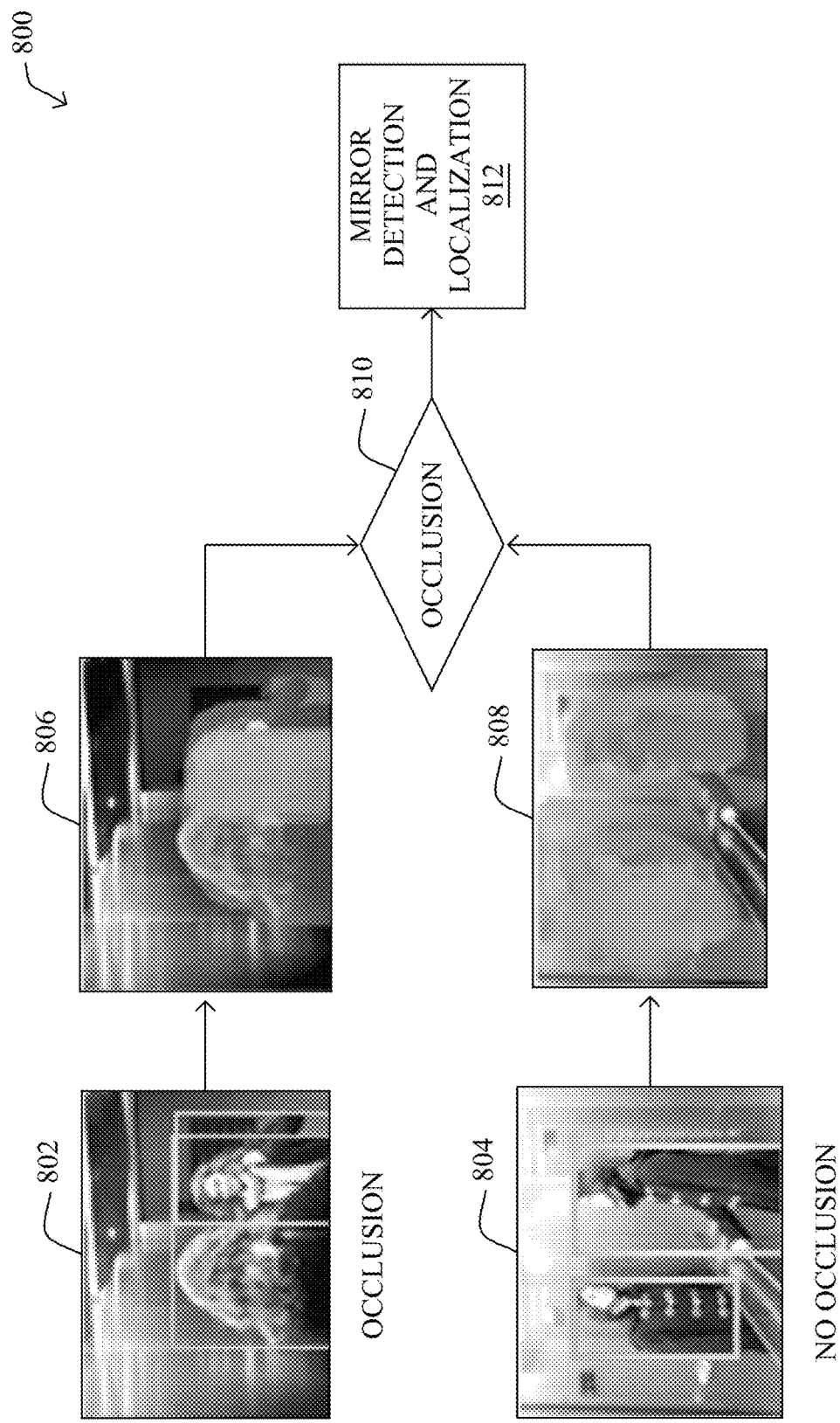
FIG. 8 illustrates an example architecture for discerning between a real object and its reflection in video data.

FIG. 8 illustrates an example architecture 800 that video analytics process 248 may also use for discerning between a real object and its reflection in video data, according to further embodiments. Here, the occlusion of a reflection in the video data by its corresponding, real object will have an effect on their respective heatmaps. For instance, consider image 802 in which the reflection of the person is at least partially occluded by them. In contrast, image 804 illustrates the case in which the reflection is not occluded at all. Over time, it is likely that both scenarios will be present in the video data captured for that location, especially if the video data is captured from different angles by multiple cameras.

Video analytics process 248 may then generate heatmaps over time based on the number of detected reflections/object pairs within the video data. Here, in the case of no occlusion (e.g., image 804), the heatmap 808 for the person and their reflection will exhibit separate regions, with the region depicting the reflective surface typically having a larger corresponding heatmap than that of the actual person. Similarly, the heatmap 806 in the case of occlusion will exhibit a region of highest number of pair detections between the actual person and their reflection.

By analyzing the heatmaps, video analytics process 248 may make a determination 810 that occlusion exists between the pair of detected objects having correlated behavioral regimes, allowing it to perform mirror detection and localization 812. More specifically, since a reflection can never occlude its correspond real person or other object, video analytics process 248 may flag the occluded one of the pair as being the reflection.

In some embodiments, video analytics process 248 may use the detected reflections to also localize the reflections within the video data. Doing so allows video analytics process 248 to identify over time the region(s) in the video data where the reflective surface is depicted. Such regions can then be provided to a user interface for display (e.g., to allow a user to confirm or reject the determination, etc.), to disable certain analytic functions for those regions of the video data, or the like.

Figure 9:
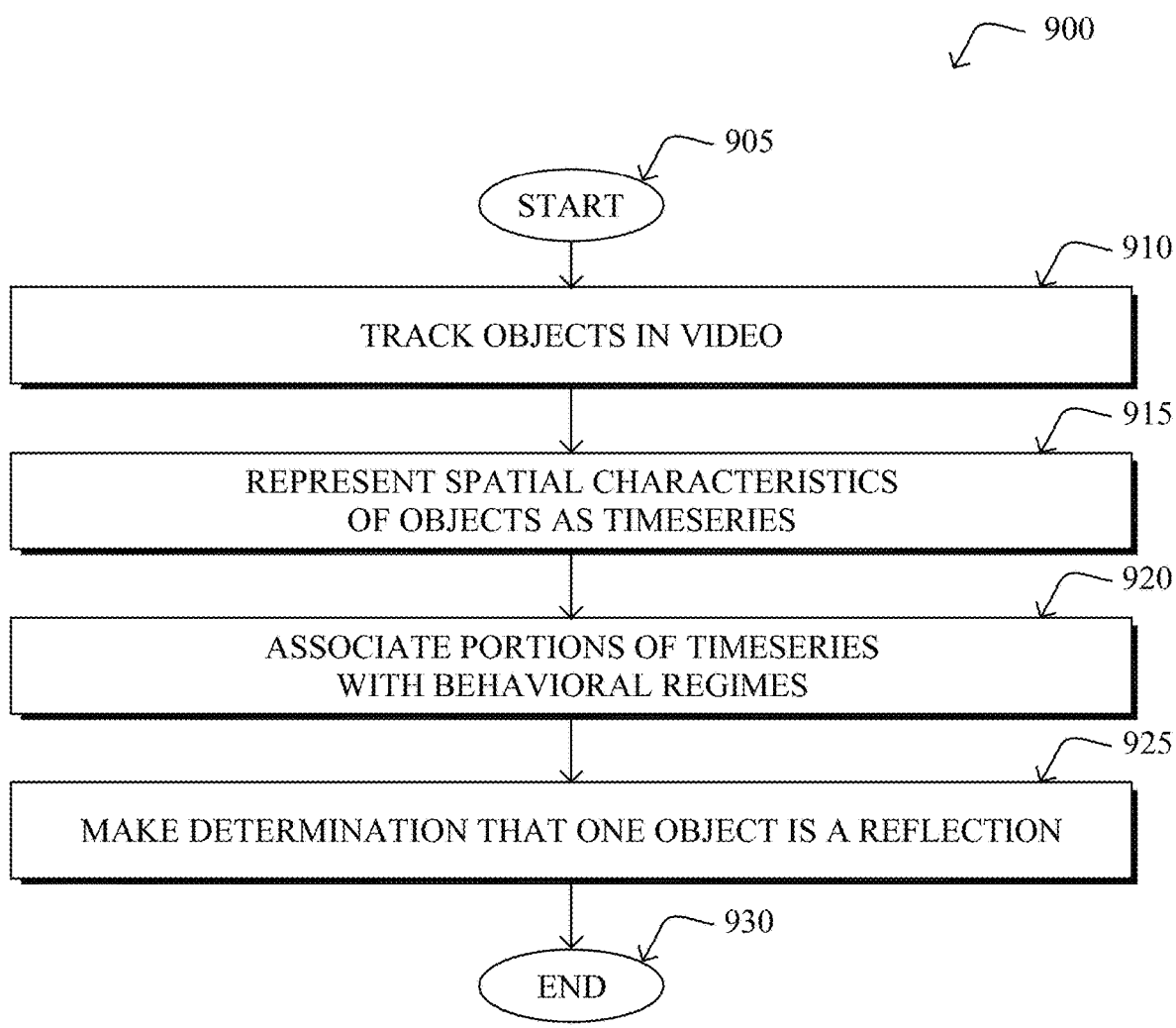
FIG. 9 illustrates an example simplified procedure for reflection detection in video analytics.

FIG. 9 illustrates an example simplified procedure 900 (e.g., a method) for reflection detection in video analytics, in accordance with one or more embodiments described herein. For example, a non-generic, specifically configured device (e.g., device 200) may perform procedure 900 by executing stored instructions (e.g., video analytics process 248). The procedure 900 may start at step 905, and continues to step 910, where, as described in greater detail above, the device may track objects in video data captured by one or more cameras in a location. In various embodiments, the objects are people in the location, vehicles, or other objects. In some embodiments, the device may be an edge device in a network, a server, or other computing device.

At step 915, as detailed above, the device may represent spatial characteristics of the objects over time as timeseries. In some embodiments, the spatial characteristics comprise detected centroids of the objects.

At step 920, the device may associate different portions of the timeseries with behavioral regimes of the objects, as described in greater detail above. In some embodiments, the behavioral regimes comprise different patterns of the timeseries associated with the objects performing various actions.

At step 925, as detailed above, the device may make a determination that one of the objects is a reflection of another of the objects, based on a correlation between changes of their respective behavioral regimes. In some embodiments, the determination is based in part on an amount of mutual information between the timeseries. According to various embodiments, the device may also identify, based on the determination, a region of the video data as depicting a reflective surface in the location, as well as stopping tracking objects in the region. In one embodiment, the device may identify the region in part by computing a heatmap of reflections detected in the region. In another embodiment, the device may also provide an indication of the determination to a user interface for presentation to a user.

Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for reflection detection in video analytics, it is to be understood that various other adaptations and modifications may be made within the spirit and scope of the embodiments herein. For example, while certain embodiments are described herein with respect to specific use cases for the techniques herein, the techniques can be extended without undue experimentation to other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof, that cause a device to perform the techniques herein. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   tracking, by a device, objects in video data captured by one or more cameras in a location;
   computing, by the device, spatial characteristics of the objects;
   generating, by the device, a timeseries of the spatial characteristics of the objects over time, wherein the timeseries represents behaviors of the objects;
   associating, by the device, different portions of the timeseries with behavioral regimes of the objects, wherein each behavioral regime is defined by a distinctive pattern in the timeseries indicative of an activity performed by the objects;
   computing, by the device, a correlation between each behavioral regime of different objects based on their respective timeseries; and
   making, by the device and based on the correlation, a determination that one of the objects is a reflection of another of the objects.

2. The method as in claim 1, wherein the spatial characteristics comprise detected centroids of the objects.

3. The method as in claim 1, wherein the behavioral regimes comprise different patterns of the timeseries associated with the objects performing various actions.

4. The method as in claim 1, wherein the objects are people in the location.

5. The method as in claim 1, further comprising:
   identifying, by the device and based on the determination, a region of the video data as depicting a reflective surface in the location; and
   stopping, by the device, tracking objects in the region.

6. The method as in claim 5, wherein the device identifies the region in part by:
   computing a heatmap of reflections detected in the region.

7. The method as in claim 1, wherein the determination is based in part on an amount of mutual information between the timeseries.

8. The method as in claim 1, wherein the objects comprise vehicles.

9. The method as in claim 1, further comprising:
   providing, by the device, an indication of the determination to a user interface for presentation to a user.

10. The method as in claim 1, wherein the device is an edge device in a network.

11. An apparatus, comprising:
    a network interface to communicate with a computer network;
    a processor coupled to the network interface and configured to execute one or more processes; and
    a memory configured to store a process that is executed by the processor, the process when executed configured to:
    track objects in video data captured by one or more cameras in a location;
    compute spatial characteristics of the objects;
    generate a timeseries of the spatial characteristics of the objects over time, wherein the timeseries represents behaviors of the objects;

associate different portions of the timeseries with behavioral regimes of the objects, wherein each behavioral regime is defined by a distinctive pattern in the timeseries indicative of an activity performed by the objects;

compute a correlation between each behavioral regime of different objects based on their respective timeseries; and make a determination, based on the correlation, that one of the objects is a reflection of another of the objects.

12. The apparatus as in claim 11, wherein the spatial characteristics comprise detected centroids of the objects.

13. The apparatus as in claim 11, wherein the behavioral regimes comprise different patterns of the timeseries associated with the objects performing various actions.

14. The apparatus as in claim 11, wherein the objects are people in the location.

15. The apparatus as in claim 11, wherein the process when executed is further configured to:

identify, based on the determination, a region of the video data as depicting a reflective surface in the location; and stop tracking objects in the region.

16. The apparatus as in claim 15, wherein the apparatus identifies the region in part by:

computing a heatmap of reflections detected in the region.

17. The apparatus as in claim 11, wherein the determination is based in part on an amount of mutual information between the timeseries.

18. The apparatus as in claim 11, wherein the objects comprise vehicles.

19. The apparatus as in claim 11, wherein the process when executed is further configured to:

provide an indication of the determination to a user interface for presentation to a user.

20. A tangible, non-transitory, computer-readable medium storing program instructions that cause a device to execute a process comprising:

tracking, by the device, objects in video data captured by one or more cameras in a location;

computing, by the device, spatial characteristics of the objects;

generating, by the device, a timeseries of the spatial characteristics of the objects over time, wherein the timeseries represents behaviors of the objects;

associating, by the device, different portions of the timeseries with behavioral regimes of the objects, wherein each behavioral regime is defined by a distinctive pattern in the timeseries indicative of an activity performed by the objects;

computing, by the device, a correlation between each behavioral regime of different objects based on their respective timeseries; and making, by the device and based on the correlation, a determination that one of the objects is a reflection of another of the objects.

* * * * *